May 31, 1927.
A. BEHM
1,630,689
METHOD FOR ASCERTAINING THE FLYING HEIGHT OF FLYING MACHINES
Filed June 2, 1922
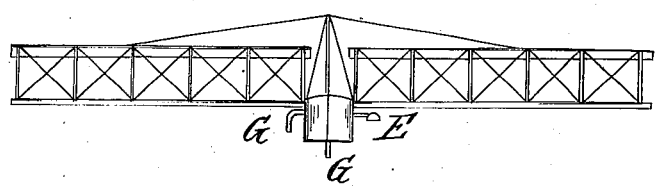
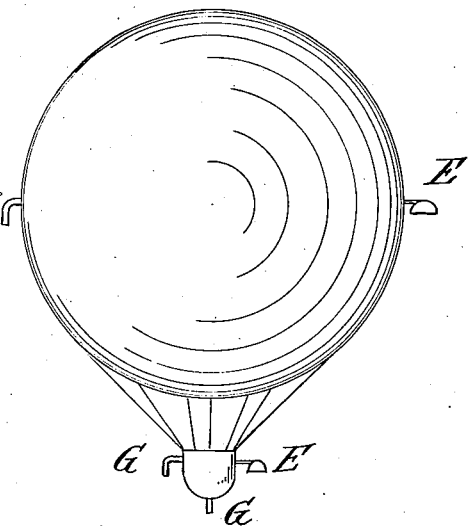
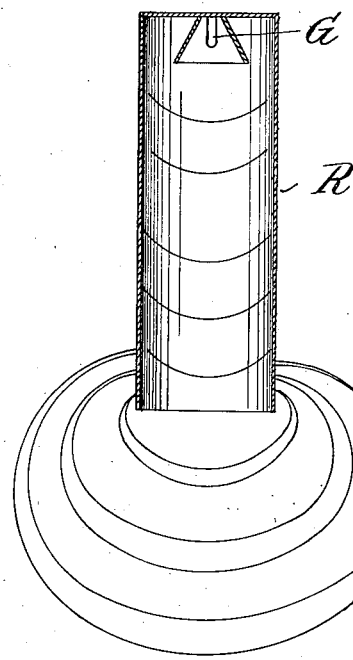
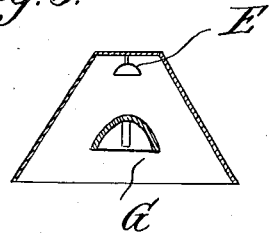
Inventor;
Alexander Behm,
By Kingler Bros
attys

Patented May 31, 1927.

1,630,689

UNITED STATES PATENT OFFICE.

ALEXANDER BEHM, OF KIEL, GERMANY.

METHOD FOR ASCERTAINING THE FLYING HEIGHT OF FLYING MACHINES.

Application filed June 2, 1922, Serial No. 565,502, and in Germany June 11, 1921.

It is known that the absolute altitude of a flying machine is measured by means of a barometer. This way of measuring must fail for ascertaining the relative flying altitude, because it is rarely possible, to ascertain the altitude above the sea level just below the flying machine. Aside from this fact the conditions of atmospheric pressure may change during the flight to such an extent, that the readings of the barometric meter will only be approximately correct.

If the pilot of a flying machine wants to land at night or in foggy weather, it is of tremendous importance for him to know at what altitude he is flying above the earth, or in case of a sea plane, above the sea, as he can neither see the earth nor the sea. As a fact during the war an extraordinarily large number of flying machines have been wrecked at night or in foggy weather, simply because the pilot could not find out his altitude above the earth or the sea. Aside from the material damage many pilots and passengers lost their lives or at least were badly hurt.

It is the object of this invention, to enable the pilot of a flying machine to ascertain within a foot at night or in foggy weather at what altitude above the earth or the sea he is flying at the time. This is accomplished by sending a sound wave from the flying machine and the relative altitude above the earth or sea will be found by observing the time or the intensity at the return of the echo. The sound wave may be created by shooting a pistol or a gun, or by the firing of a cartridge or in a similar way, and the sound wave must be directed toward the earth, in the case of a gun this is done by the direction of the barrel; when using a cartridge a horn or parabolic sound conductor may be used. In order not to have the sender of the sound interfere with the receiver, one must be protected from the other. In the case of a flying machine this may be done by using the body of the machine for protection, in the case of an air ship, the balloon or the car of the air ship may be used for protection. A sufficiently large protection may be secured by arranging the receiver behind the sender.

The time which passes between the sending of the report and the receiving of the echo may be measured in the most simple manner by a stop watch, which is started at the firing of the gun and stopped at the return of the echo. While this method of measuring the time is satisfactory for measuring the higher altitudes, it is not accurate enough for the real object of this invention, that is the sounding of the last few feet of distance from the earth or sea level of a flying machine. For this purpose a short distance timing device is employed, which is started by the sound of the report and arrested by the returning sound wave with the aid of a microphone. In order to send a number of sound waves in quick succession, the sender may be of the machine gun type. In the case of armed flying machines the machine gun of the flying machine may be used for sending by loading it with blank cartridges and by mounting the gun in such a way, that the barrel may be turned downward. Generally speaking, all improvements and appliances, which are used in deep sea sounding in employing the echo, may correspondingly also be employed in ascertaining the altitude of a flying machine. My method may also be used for adjusting altitude barometers and for checking the same, as long as the absolute altitude above sea level of the country below is known, or if the machine is flying above the sea.

The method described in this application may also be used in a different manner for the safety of the flying machine. It is known that the sound of an echo is largely dependent on the shape and material of the object reflecting the sound. Consequently it will be a matter only of little practice to find accurately from the sound of the echo the condition of the ground below. By using a sender adapted to emit sound waves at certain short intervals, the pilot of a flying machine by watching the echo will know in the thickest of fogs or in the darkest of nights whether he is flying over built up territory, or woods, or water and will know from this information, whether or not he may land. By the use of suitable interrupters the microphone may be adjusted in such a manner, that it will not answer to a sound wave going out, but only to the echo returning. The pilot after having determined in this manner that his machine is flying over level ground, such as a field or a meadow, will switch his sounding device so as to measure his distance from the ground. Then if his meter is recording in succession: 30′, 25′, 20′, 15′, 10′, 6′, he may land as safely in a fog or in a dark night as in broad day light.

I attain these objects by the mechanism illustrated in the accompanying drawing, in which—

Fig. 1 is a vertical section of a flying machine,

Fig. 2 is a vertical section of an air ship, and

Figs. 3 and 4 are detail sections.

The sender in every case is marked —G—, the receiver in every case is marked —E—. As shown the sender may be arranged on one side of the body or car of the air machine, the receiver may be arranged on the opposite side, using the car for protection. In a similar manner it is possible to use the body of the air ship as sound protecting screen, in which case the sender is on the right side of the balloon and the receiver on the left side or vice versa. The sending device may be attached to the bottom of the car. This may easily be done in the case of directed sound waves, the intensity of the sound waves in the opposed direction being negligible, so that the receiver will not be affected. This latter property of directed sound waves makes possible the arrangement shown in Fig. 3, where the receiver is located immediately behind the sender.

Apart from using the air machine itself for protection, special sound protecting screens may be used as shown in Fig. 4, where the sender is arranged in a wide long tube —R—, containing a sender of any suitable design. At first the sound wave directed by the sender will be protected by the tube —R—, so that the receiver may be located side ways or preferably behind the tube.

The respective location of the sender and receiver will partly depend on the type of the air machine, partly on the purpose to be achieved. The general arrangements shown are simply examples of the application of my invention without limiting the same.

As for the instruments used for timing the echo or for measuring the intensity of the echo waves, they are not limited to any particular design, in fact all suitable arrangements may be used, either in their original shape, or in any condition especially adapted for aeronautics and those which are used in navigation for deep sea sounding. In this connection I mention switches and instruments, which are disconnected during the firing of the gun and automatically connect the receiver before the echo has returned.

I claim:

1. The combination with an air craft of a sound transmitter arranged to emit sounds toward the earth, and a receiver arranged to respond to the echoes of such sounds, said transmitter and said receiver being acoustically screened from each other by a portion of the air craft structure, for the purpose set forth.

2. The combination with an air craft or the like including a body, of a sound transmitter arranged to emit sounds towards the earth, and a receiver arranged to respond to the echo of such sounds, said transmitter and said receiver being acoustically screened from each other by the body of the air craft, for the purpose set forth.

3. The combination with an air craft or the like including a body, of a sound transmitter arranged to emit sounds towards the earth, and a receiver arranged to respond to the echo of such sounds, said transmitter and said receiver being acoustically screened from each other, said receiver being arranged behind said transmitter relative to the direction of sound emission, for the purpose set forth.

The foregoing specification signed at Kiel this 20th day of May, 1922.

ALEXANDER BEHM.